Jan. 27, 1925.
W. G. BURNS ET AL
1,524,387
MACHINE FOR ROASTING AND COOLING PEANUTS
Filed March 29, 1922 4 Sheets-Sheet 4
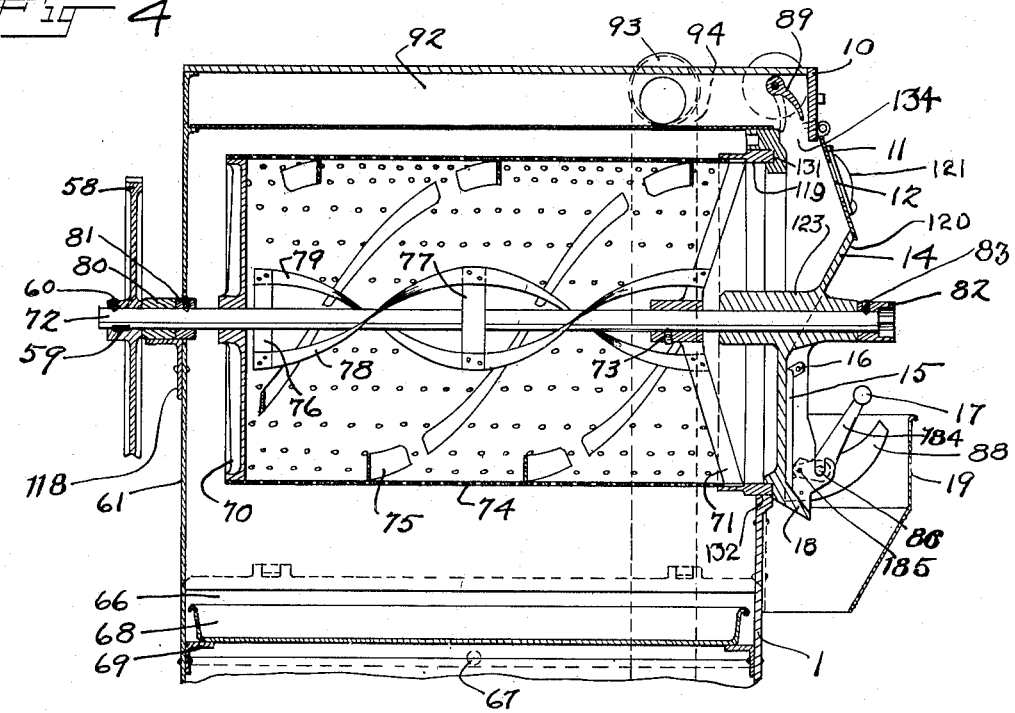
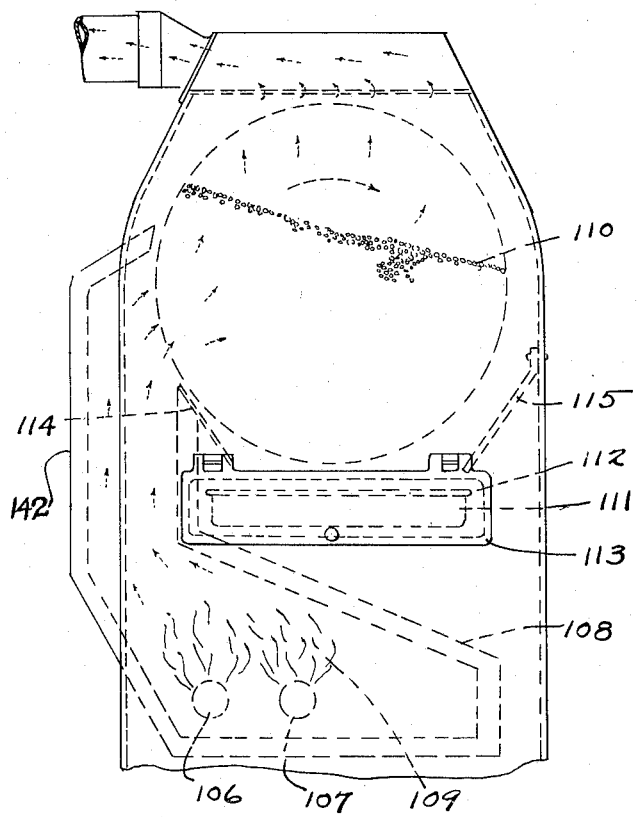
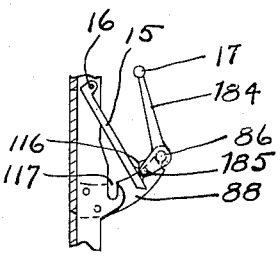
INVENTORS
William G. Burns
Richard A. Greene,
BY
ATTORNEY Patented Jan. 27, 1925.

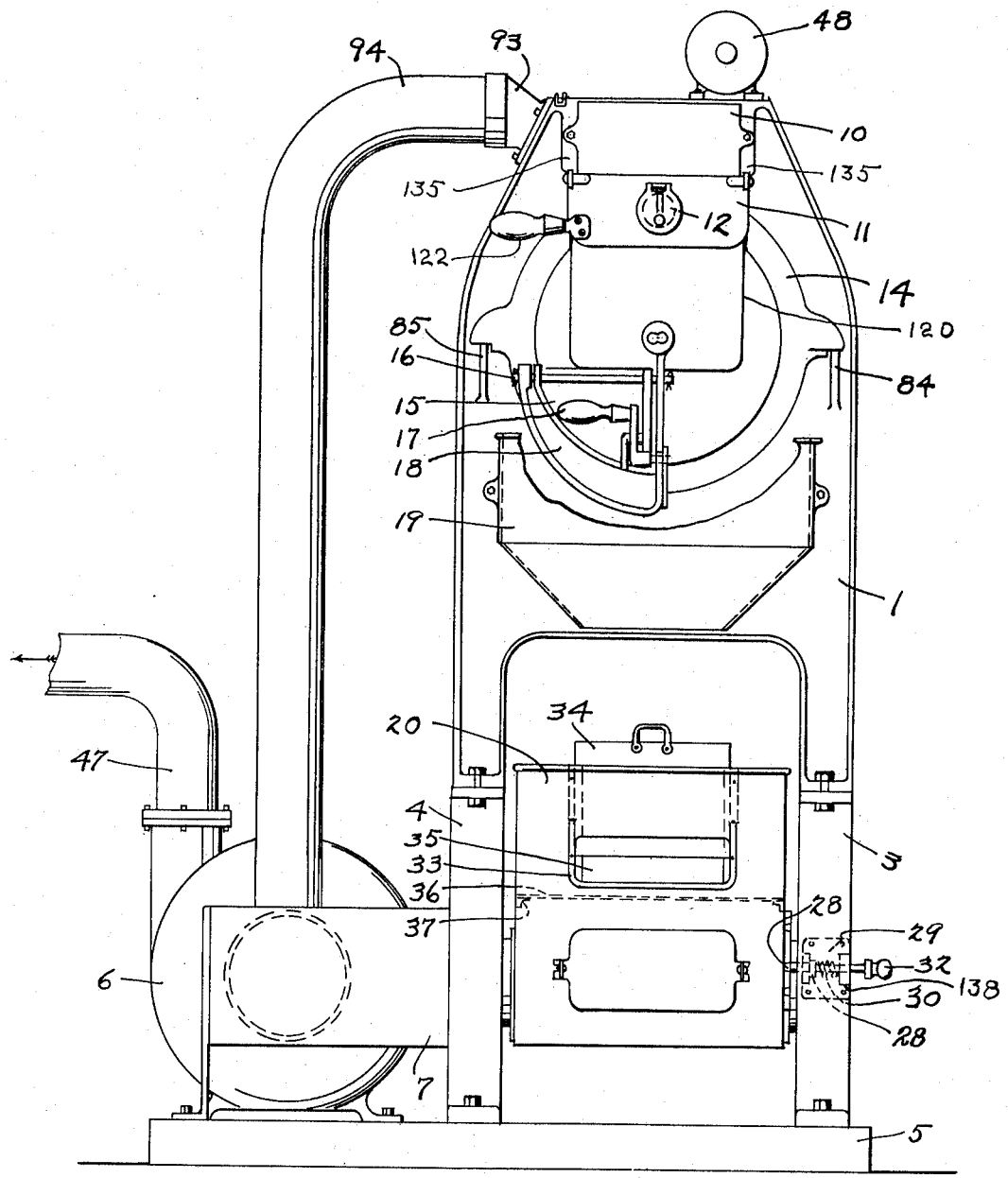

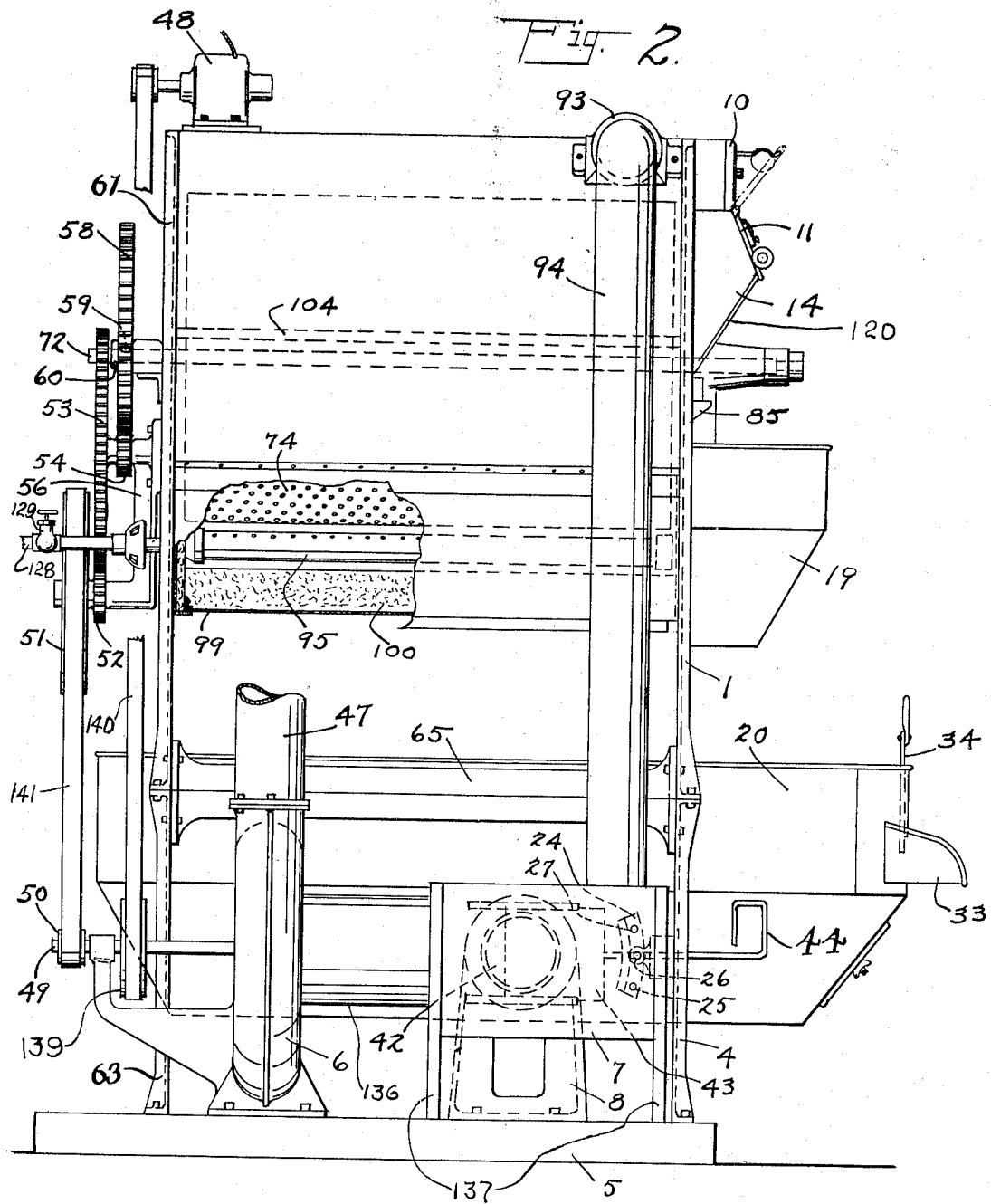

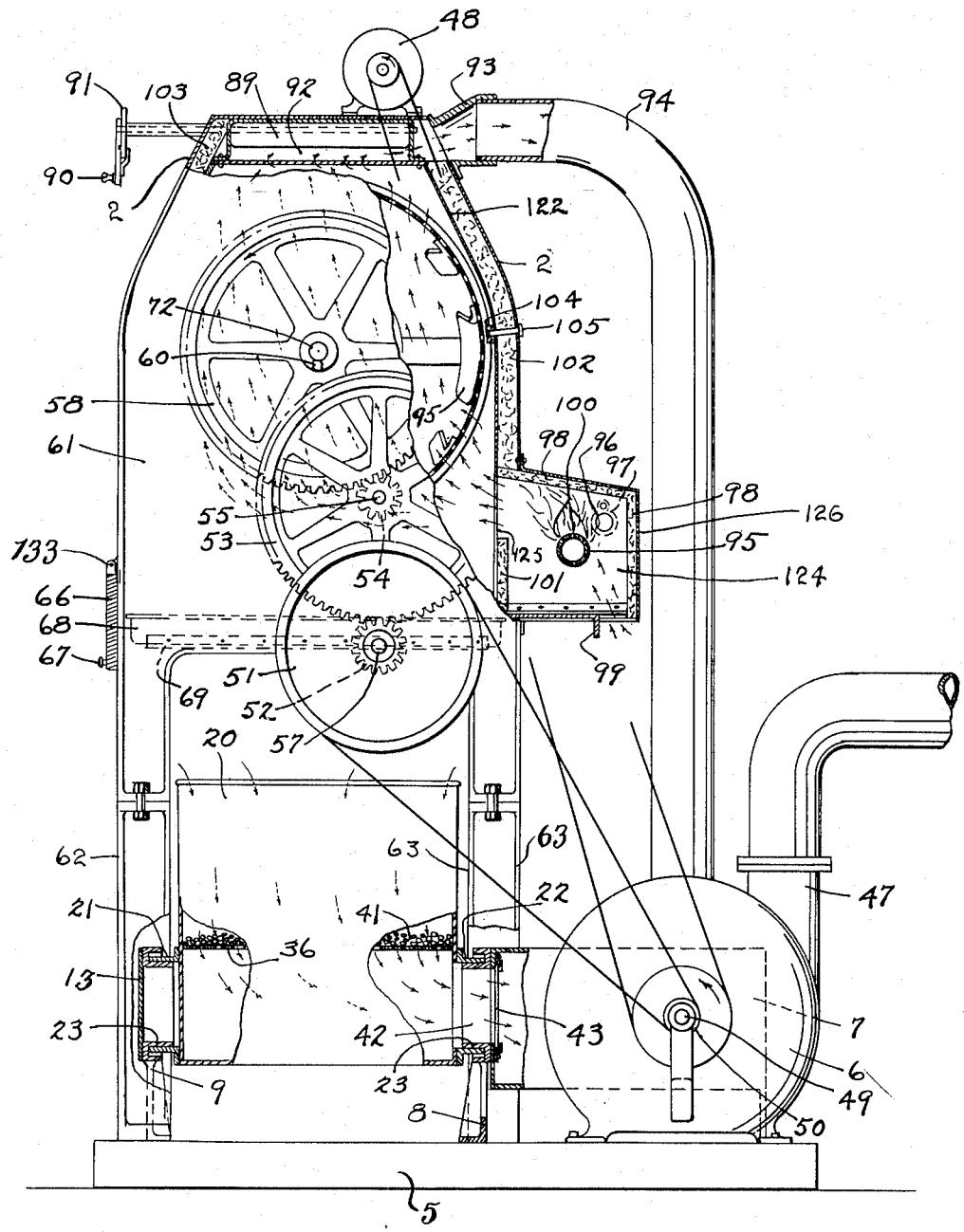

1,524,387

UNITED STATES PATENT OFFICE.

WILLIAM G. BURNS, OF NEW YORK, AND RICHARD A. GREENE, OF BROOKLYN, NEW YORK, ASSIGNORS TO JABEZ BURNS & SONS, A CORPORATION OF NEW YORK.

MACHINE FOR ROASTING AND COOLING PEANUTS.

Application filed March 29, 1922. Serial No. 547,637.

*To all whom it may concern:*

Be it known that we, WILLIAM G. BURNS and RICHARD A. GREENE, citizens of the United States, and residents of New York city, county of New York, State of New York, and in Brooklyn, in the county of Kings and State of New York, respectively, have invented certain new and useful Improvements in a Machine for Roasting and Cooling Peanuts, of which the following is a specification.

This invention relates to a machine for roasting and cooling peanuts in large quantity, and has for its object to produce such a machine for handling the peanuts in either shelled or unshelled condition. In the roasting of peanuts, the operation should proceed with perfect uniformity throughout the entire batch. Especially in the case of shelled peanuts, the process must not be hurried, and the agitation necessary to insure uniform treatment should be as gentle as possible, so as to avoid rubbing off of the skin and consequent discoloration of the nuts. The temperature must be maintained sufficiently high to roast the nuts, while at the same time it must be kept low enough to prevent burning of the skin or nut, or breaking down of the volatile oils. It is desirable, after completion of the roasting operation, to cool the peanuts as rapidly as possible, not only to expedite the process of handling them by permitting early packing and shipment, but also to prevent deterioration of the product resulting from prolonged heating.

In carrying out our invention, we have devised a roaster having a slowly rotating drum, agitation being effected mechanically by a device which insures constant and uniform redistribution of every particle of the entire mass. This drum is of the usual perforated type, through which is passed a current of heated gas from suitable burners, the amount and temperature of such gas being subject to regulation. This drum is closed at one end, and at the opposite end it abuts a non-rotating cover having a charging door in its upper portion and a discharging door in its lower portion, both of said doors being closed during the actual roasting. Mechanism is provided for rotating the drum, and within the drum are helical baffles, those of which adjacent the axis being so directed as to cause a movement of the material away from the charging door, and the peripherally disposed baffles being so directed as to cause movement toward the discharging door. These two movements thus insure thorough circulation of the peanuts in a plane longitudinal of the drum axis, and at the same time facilitate the operations both of feeding and discharging. The rotation of the drum will also effect a circulation in a plane transverse to the axis, which in combination with the other movements above, described, will cause a thorough and continuous mixing, so that each portion of the entire mass will be subjected to absolutely uniform treatment.

A cooling pan is positioned, for reasons of compactness, and other obvious considerations, beneath the roasting drum; and an arrangement is provided whereby the latter discharges directly into a cooling pan. As this discharge takes place from the end of the drum, the peanuts will fall upon the corresponding end of the cooling pan; hence means are provided for tilting said end upwardly so as to spread the peanuts over the entire pan. The peanuts are removed from the pan by tilting the latter in the opposite direction and opening a discharging gate in the end wall of the pan. The peanuts do not rest directly upon the bottom of the pan, but upon a perforated tray supported thereabove; and a current of air for cooling purposes is effected by exhausting the air from the pan below the level of the tray through a hollow trunnion on which the pan is mounted. Means are provided for locking the pan in horizontal or in either of its tilted positions on this trunnion mounting. The same blower which draws the heated gases through the roasting drum is also utilized to maintain the current of cooling air.

With these and other objects in view we have devised the apparatus embodying our invention as described in the following specification and illustrated in the accompanying drawings, of which—

Figure 1 is a front elevation of the machine,

Figure 2 is a side elevation thereof,

Figure 3 is a rear elevation thereof partly in section,

Figure 4 is a longitudinal section of the upper portion of the machine showing the roasting drum, Figure 5 is an end view of the upper portion of the machine showing a modified heating arrangement, and Figure 6 is a detail of the discharging door and associated mechanism.

Referring to the drawing, 1 indicates the forward end frame, mounted on legs 3 and 4, which are bolted or otherwise secured to base 5; and 61 indicates the rear end frame mounted on legs 62 and 63, likewise secured to base 5. End frames 1 and 61 are connected by longitudinal members 65. Metal sheathing 2, constituting a hood, extends between end frames 1 and 61 and is secured to the top and upper side portions of said respective frames. Inside of hood 2, and parallel thereto is a similar hood 122 secured at either end to frames 1 and 61, and the space between the side walls of hoods 2 and 122 is filled with asbestos 102, or other suitable heat insulating material, the space 92 between the top walls of said hoods being left empty.

The space 92 between hoods 2 and 122, and the space within the latter, is closed at the rear end by the web of rear frame 61. The web of forward end frame 1 is discontinued to permit access from the forward end to space 92 between the top walls of hoods 2 and 122. The opening thereby afforded is normally closed by a cover plate 10, which is bolted or otherwise detachably secured, not directly to the web surface, but to a pair of forwardly extending flanges or lugs 135 on frame 1, so that cover 10 overhangs the web. Outer hood 2 extends to cover plate 10, while inner hood 2 terminates at the web of end frame 1, thus providing a downwardly extending opening 134 from the space included between the top walls of said respective hoods.

A substantially circular opening of relatively large diameter, is provided beneath in the web of frame 1 directly below cover plate 10. Cover plate 14, supported by a pair of integral ears resting on lugs 84 and 85 extending from frame 1, is provided for this opening. In cover plate 14 is a centrally disposed bearing 123, and a bearing 80 in axial alignment with bearing 123 is carried by bracket 118 mounted on the outside of rear end frame 61. Shaft 72, extending through a small opening of the web of rear end of frame 61, is journalled in bearings 123 and 80. Secured to the rear end of shaft 72 by key 59 and by set-screw 60 providing for longitudinal adjustment, is shaft driving gear 58, the finished inner face of the hub of which abuts the finished outer face of bearing 80, which thus also constitutes a thrust bearing. A thrust collar 81, secured to shaft 72 by a set screw, abuts the finished inner face of bearing 80. Secured to the forward end of shaft 72 by a set screw 83 is thrust collar 82, which abuts the outer finished face of bearing 123.

Annular rim 119, carried by spider 71 having its hub secured to shaft 72 by set screw 73, provides a support for perforated drum 74 and at the same time effects end closure for drum 74 against cover 14 as at 131 around its entire circumference, also effecting closure against the edge of the opening in frame 1, as at 132. Cover 14 is thus held between flange 119 and collar 82, and is free to move in and out on lugs 84 and 85 to accommodate the expansion and contraction of shaft 72 and drum 74 with changes in temperature. A slight clearance (not shown) is provided between flange 119, cover 14, and collar 82 to provide for differential expansion of shaft 72 and drum 74.

The rear end of drum 74 is closed and also supported by disc 70, the hub of which is mounted on shaft 72. Mounted upon the inner surface of drum 74 are a plurality of helical flanges or baffles 75. Mounted respectively on a pair of opposite arms of spider 71 are a pair of strips 78 and 79 extending substantially the length of the interior of drum 74 and disposed close to shaft 72, said strips being twisted into a helix oppositely directed from the helix of baffles 75, and connected together at suitable intervals by pieces 76 and 77.

The upper portion of cover 14 is inclined outwardly and upwardly to form a feed chute 120, the open upper end thereof being normally closed by a door 11, hinged to cover 14 and having a peep hole 12 therein normally closed by a movable cover 121. Hinged as at 16 to cover 14 and normally closing an opening in the lower portion thereof is a door 15 having a handle 184 pivoted thereto, as at 185 hand grip 17 being on the outer end of handle 184. Projection 116 on handle 184, by contacting with door 15 limits the movement of said handle in the direction of said door, thereby keeping hand grip 17 at a safe distance from the heated parts of the apparatus and preventing injury to the operator. A transverse projection 86 on handle 184 normally engages slot 117 in latching member 88 secured to cover 14. Door 15 is maintained in open position by hooking transverse projection 86 over the outer end of member 88, the latter having a smoothly curved upper surface between said end and said slot 117 to guide said projection 86 back into slot 117 when released. The lower portion of cover 14 is inclined outwardly and downwardly from the lower edge of said opening closed by door 15, to form a discharge chute 18. A sheet metal guide 19 secured to frame 1 and surrounding chute 18 prevents spilling of the product and insures its downward delivery.

Extending from frame 1 to frame 61 about or below the level of the lower portion of drum 74, and built out from the side wall constituted by sheathing 2 and 122 and the interposed lagging 102, is a heating box 124, the interior thereof communicating with the space inside said side wall through an opening 125 in the latter. The walls of box 124, excepting the bottom wall, consist of sheathing 126 continuous with sheathing 2 and filled with heat insulating material 98. The bottom of box 124 is open and may be closed to any desired extent by a sheet metal slide 99 to regulate the draft. A pipe 95 constituting a burner nozzle and having a plurality of jets 100 extends within box 124 throughout the length thereof, one end of nozzle 95 being connected to a source of fuel supply 128 controlled by a valve 129. A baffle 101 of heat insulating material extends across the lower portion of opening 125. At one end of box 124 is a peep hole 96 normally closed by a movable cover 97.

Beneath drum 74 and on about the level of lower edge of opening 125, is chaff pan 68 extending substantially the length and breadth of the interior space within hoods 2 and 122 and frames 1 and 61 and loosely fitting therein. Chaff pan 68 rests upon brackets 69 carried by end frames 1 and 61, and may be removed and replaced through door 66 dependingly hinged as at 133 to either end frame. Door 66 is disposed on the opposite side of the apparatus from heating box 124, and sheathing 2 and 122 together with filling 102 terminate about or slightly below the upper edge of door 66. In the preferred construction as shown in Figure 3, the bottom of heating box 124 immediately adjoins chaff pan 68, and sheathing 2 and 122 and filling 102 may terminate at the top wall of heating box 124.

It will now be apparent that the space surrounding drum 74 is effectively enclosed by sheathing 122, end frames 1 and 61, door 66, heating box 124, and chaff pan 68, and that below the latter no sheathing will be necessary and the webs of end frames 1 and 61 may be discontinued. It will also be apparent that the space between the top walls of hoods 2 and 122 has no direct communication with the space surrounding drum 74, but has direct communication with the interior of said drum through passage 134 and feed chute 120. This communication is subject to control by a hinged gate valve or damper 89 in passage 134, having its valve stem or shaft extending through an opening in hoods 2 and 122, and provided with a handle 90 easily accessible to the operator. Handle 90 is provided with a frictionally engaging sector 91 to maintain it in given position, sector 91 having graduations to indicate the amount of opening of damper 89.

Blower 6, secured to base 5, exhausts through pipe 47 outside the building, and has its suction intake connected, through pipe 136, to draft box 7, the latter being mounted on base 5 by legs 137. Draft box 7 is connected with the space between the top walls of hoods 2 and 122 by a pipe 94, which communicates with said space through a suitable fitting 93 adjacent damper 89. The suction from draft box 7 will cause fresh air to be drawn in the heating box opening, thence past burner nozzle 95 where it is heated and mingles with the heated combustion products, thence past baffle 101 and through the perforations of drum 74, passing through the interstices between the product therein and adequately and evenly cooking said product, thence through the open forward end of drum 74, thence up chute 120 and through opening 134 subject to control of damper 89 into pipe 94 and to draft box 7. A sealing strip 104, of asbestos or other suitable material is secured by countersunk attaching means 105 to the wall of the roaster, and engages drum 74 with minimum clearance along its entire length to deflect the heated gases into the drum below the level of the peanuts therein.

Cooling pan 20 is positioned beneath chaff pan 68 and is of substantial width, clearing the inner edges of frame legs 3, 4, 62 and 63 by not more than a reasonable clearance. It extends rearwardly to about or beyond rear frame 61, and forwardly well beyond forward frame member 1, so as to be in the path of discharge of chute 18 and guide 19 to receive the product as the same is discharged from drum 74. Pan 20 is mounted on a pair of transversely extending trunnions 21 and 22, journalled on bearings 23 carried on supports 9 and 8 respectively, said supports being secured to base 5. Attached to one side of pan 20 is a sector plate 24 concentric with the axis of trunnions 21 and 22, having a plurality of holes 25, 26 and 27 to engage plunger 28 reciprocatably mounted in bracket 29 secured to leg 3. Helical spring 30 around plunger 28 and maintained in compression by collar 31 on the latter and shoulder 138 on bracket 29, tends to force plunger 31 into either of holes 25, 26 and 27, while knob 32 on the outer end of plunger 28 provides for retracting the latter when tilting pan 20. As pan 20 is supplied adjacent its forward end, it is desirable to tilt it backward in order to insure uniform spreading of the material in loading the same, and pan 20 will then be locked in tilted position by plunger 28 engaging hole 25. Pan 20 is dumped from the forward end through an opening 35 in the forward wall normally closed by gate 34 and provided with dumping spout 33, said pan being locked in dumping position by the engagement of plunger 28 with hole 27. Hole 26 provides for locking pan 20 in normal or horizontal position. The product does not rest upon the floor of pan 20, but upon a perforated cooling tray 36 supported on brackets 37 carried on the walls of pan 20. Trunnion 22 is hollow and opens into pan 20 below tray 36. Bearing 23 for trunnion 22 is also hollow and opens as at 42 into draft box 7, thus affording direct communication between the latter and the base of pan 20, subject to the control of sliding damper 43 interposed in opening 42 and having an actuating handle 44. The suction from draft box 7 will draw a current of cooling air through the layer of product 41 on perforated tray 36. Trunnion 21 and its bearing 23 are likewise made hollow for lightness and uniformity of construction, but trunnion 21 does not open into pan 20. The outer end of trunnion 21 is covered with a cap 13.

Fan 6 is driven through pulley 139 keyed to its shaft 49, by belt 140 driven by motor 48 on the top of the roaster. Pulley 50, also keyed to shaft 49, drives pulley 51 on stub shaft 57 mounted in bracket 56 secured to end frame 61, through belt 141. Pinion 52 on shaft 57 and securely fixed to pulley 51 drives gear wheel 53 on stub shaft 55, also mounted in bracket 56. Pinion 54 on shaft 55 and securely fixed to gear wheel 53, drives gear wheel 58, previously mentioned, thereby rotating drum 74. The direction of rotation of drum 74 must be such in relation to helical baffles 75, and 78 and 79, as to move the portions of the product adjacent shaft 72 toward the rear end of drum 74, away from charging chute 120, and to move the portions of the product adjacent the periphery of drum 74 toward discharge door 15. With said baffles arranged as in Figure 4, the direction of rotation, in front view, should be clockwise. Motor 48 and drum 74 will have the same direction of rotation. A slight reduction in speed is effected between motor 48 and fan 6, the motor pulley being of smaller diameter than fan pulley 139. A relatively great reduction is effected between motor 48 and drum 74, as pulley 50 is smaller than the fan pulley and pulley 51 is very much larger than pulley 50. Pinion 52 is smaller than pulley 51, and each of gears 53 and 58 is very much larger than either of its driving or driven pinion.

In Figure 5 is shown, diagrammatically, a modified heating arrangement wherein outside heating box 124 is dispensed with, and an inside heating box 108 is provided beneath drum 74. In place of chaff pan 68 is substituted a narrow chaff pan 111, positioned between heating box 108 and drum 74. A flue 142 conducts the heated gases from burners 106 and 107 to the side of drum 74. Chaff pan 111 permits flue 142 to pass around the same without having to extend very far outside the contour of the side wall. Baffles 114 and 115, together with chaff pan 111, seal the drum compartment from the atmosphere and thus increase the draft from burners 106 and 107. Said baffles also prevent chaff from falling around the sides of the chaff pan 111. In all other respects the arrangements are similar to those of the preferred form.

In operation, the machine is first started, and sufficient raw peanuts are fed into charging door 11 to fill drum 74 about two-thirds full. Baffles 78 and 79 cause the upper and central layer of peanuts to travel rearwardly and away from the charging door, while baffles 75 cause the lower layer to travel in reverse direction to the discharging door, and thus facilitate discharge of the same after the completion of roasting as well as to maintain circulating during the roasting. In addition to these longitudinal movements, the rotation of the drum will cause the peanuts on one side to be raised because of the lifting effect of baffles 75 on that side, and in a similar manner to be lowered on the opposite side. This will cause the upper surface of the mass to assume an angle inclined to the horizontal; and as rotation continues this angle will increase to somewhat above the angle of repose of the material, whereupon the peanuts that have been raised on one side will roll down the inclined surface to the other side, and will be carried around again by baffles 75. The combined effect of the various movements, both longitudinal and transverse, is to cause a continual redistribution of the material throughout its entire volume, subjecting each individual portion to identical temperature conditions and insuring absolute uniformity of treatment.

After the first batch have been roasted, they will be dumped into cooling pan 20 to cool during the roasting of the second batch, and this process may be repeated indefinitely.

As certain features of this invention can be carried out in connection with a different path of travel of the heating gases, viz. from an elongated flue nozzle into the perforations of drum 74 along a given sector of its periphery, and out through the perforations in the remaining portions of its periphery, this invention should not be considered as limited to the specific path disclosed, in which the gases are admitted over the entire periphery, or over a portion of the periphery, and exhausted through the open end, except where the claims include such limitation. Furthermore, many variations of arrangement, or in the specific heating means, or in the driving mechanism can be made within the scope of the invention, and the same is not limited to the precise form disclosed, except where specifically claimed.

What we claim is:

1. A peanut roaster, comprising a drum, means for heating the air to be passed through the contents of said drum, said heating means being located to one side of said drum and means whereby a current of air is passed in close proximity to said heating means and through the contents of said drum.

2. A peanut roaster, comprising a perforated drum closed at one end, means for rotating said drum, stationary means closing the opposite end of said drum, charging and discharging means for said drum, said stationary closing means having an opening through the upper portion thereof, and means for passing a current of heated gas through the perforations of the drum and through said opening.

3. A peanut roaster and cooler, comprising a roasting drum, a cooling pan positioned beneath said drum, means for discharging said drum from one end thereof into the corresponding end of said pan, means for tilting the pan to spread uniformly thereover the product received from said drum, and means for maintaining said pan in either tilted or horizontal positions.

4. A peanut roaster comprising a perforated drum, helical baffling means within said drum adjacent the periphery thereof, oppositely directed helical baffling means within said drum adjacent the axis thereof, means for passing air into said drum through said perforations, means for heating said air, and means for rotating said drum.

5. A roaster, comprising a frame, a hood attached to the upper portion of said frame, a roasting drum supported within said hood, a heating box located to one side of said drum and means whereby a current of air may be drawn through said heating box and through the contents of said drum.

6. A roaster and cooler, comprising a frame, a hood attached to the upper portion of said frame, a roasting drum supported within said hood, a heating box located to one side of said drum, a chaff pan located beneath said drum and means whereby a current of air may be drawn through said heating box and through the contents of said drum.

7. A roaster and cooler, comprising a frame, a hood attached to the upper portion of said frame, a roasting drum supported within said hood, a heating box located to one side of said drum, a chaff pan located beneath said drum, a cooling pan carried on the lower portion of said frame and positioned to receive the material discharged from said drum, means for passing separate currents of air through the material on said pan and through the contents of said drum and means for heating the air to be passed through the contents of said drum.

Signed at New York in the county of New York, and State of New York, this 17 day of March, A. D. 1922.

WILLIAM G. BURNS.
RICHARD A. GREENE.